United States Patent [19]

Leaden

[11] Patent Number: 5,327,485
[45] Date of Patent: Jul. 5, 1994

[54] TELEPHONE LOTTERY PLAY SYSTEM

[75] Inventor: Frank Leaden, Roseville, Calif.

[73] Assignee: Pacific Bell, San Francisco, Calif.

[21] Appl. No.: 984,130

[22] Filed: Dec. 1, 1992

[51] Int. Cl.[5] .......................... H04M 11/00; G06F 15/2
[52] U.S. Cl. .......................................... 379/95; 379/97;
273/138 A
[58] Field of Search ............... 379/90, 93, 96–99,
379/88, 89, 95, 102, 104, 105, 245, 246; 273/138
A, 269, 139, 439; 364/412, 410

[56] References Cited

U.S. PATENT DOCUMENTS

| B1 4,745,468 | 6/1991 | Von Kohorn | 358/84 |
|---|---|---|---|
| 4,071,698 | 1/1978 | Barger, Jr. et al. | |
| 4,191,376 | 3/1980 | Goldman et al. | 273/139 |
| 4,494,197 | 1/1985 | Troy et al. | 364/412 |
| 4,677,553 | 6/1987 | Roberts et al. | 273/138 A |
| 4,745,468 | 5/1988 | Von Kohorn | 358/84 |
| 4,764,666 | 8/1988 | Bergeron | 235/380 |
| 4,792,968 | 12/1988 | Katz | 379/92 |
| 4,815,741 | 3/1989 | Small | 273/138 A |
| 4,833,307 | 5/1989 | Gonzalez-Justiz | 235/375 |
| 4,845,739 | 7/1989 | Katz | 379/92 |
| 4,876,592 | 10/1989 | Von Kohorn | 358/84 |
| 4,882,473 | 11/1989 | Bergeron et al. | 235/380 |
| 4,922,522 | 5/1990 | Scanlon | 379/95 |
| 4,926,255 | 5/1990 | Von Kohorn | 358/84 |
| 4,937,853 | 6/1990 | Brule et al. | 379/96 |
| 4,959,783 | 9/1990 | Scott et al. | 379/97 |
| 4,966,705 | 2/1991 | Entenmann et al. | 379/91 |
| 4,969,183 | 11/1991 | Reese | 379/88 |
| 5,034,807 | 7/1991 | Von Kohorn | 358/84 |
| 5,048,075 | 9/1991 | Katz | 379/92 |
| 5,057,915 | 10/1991 | Von Kohorn | 358/84 |
| 5,083,272 | 1/1992 | Walker et al. | 379/97 |
| 5,110,129 | 5/1992 | Alvarez | 273/138 A |
| 5,128,752 | 7/1992 | Von Kohorn | 358/84 |

Primary Examiner—Wing F. Chan

[57] ABSTRACT

Playslip booklets are printed with bar code and numeric identification plus individual ticket identification numbers on each playslip. At purchase, the booklet is authorized for play through the telephone lottery computer, which provides a PIN for the booklet. To play, the bettor calls the telephone lottery computer and provides the booklet identification number and the PIN. The computer uses interactive voice capabilities to guide the player through play entry. For each lottery play, the bettor provides a playslip number. The selected lottery game wager numbers/symbols are verified by the player and may be recorded on the playslip. The telephone lottery computer returns a transaction number to be written on each ticket played to serve as a hard copy identification/verification of the transaction. The tickets then serve as the claim tickets required to collect a prize.

19 Claims, 5 Drawing Sheets

TELEPHONE LOTTERY PLAY SYSTEM

BACKGROUND OF THE INVENTION

This invention relates generally to lottery systems. More particularly, this invention relates to telephone lottery systems allowing participants to enter lottery plays by use of a telephone.

Lottery programs, typically state run, have become increasingly widespread during recent years. These programs are most often periodic drawing type lotteries, and typically require a potential lottery player to purchase each lottery play ticket at a retail location. The player will specify the combination of numbers/symbols desired to be played (or request a random selection, typically known as "quick-pick"), and the retailer will then enter the wagers into a terminal linked to the state lottery computer. The state lottery computer makes a record of the play, and returns a verification number. The lottery terminal then prints out a lottery play ticket, which indicates the played numbers/symbols of the wager, has a verification number printed thereon, and serves as a hardcopy claim-ticket for any prizes won.

Such a systems suffers the significant drawback that a potential player must travel to a retail location to enter a lottery play. Especially during inclement weather, this can dramatically reduce lottery participation. Additionally, on those occasions when lottery jackpots become quite large, long lines can develop at the lottery ticket retail locations, limiting lottery participation below what it would otherwise be.

In response to these drawbacks, a number of systems have been developed that allow a lottery player to participate by use of a touch-tone telephone. Fairly typical of these systems is that described in U.S. Pat. No. 4,922,522, "TELECOMMUNICATIONS ACCESS TO LOTTERY SYSTEMS". The '522 patent describes a system in which a lottery customer can access a lottery computer through the public telephone network, using a standard touch-tone telephone as a customer station. The telephone number of the customer is automatically provided to the lottery computer, and the customer additionally enters an identification number. If the identification number is verified, the lottery plays entered by the customer will be billed according to the telephone number. If calling from a public telephone, the customer could enter a credit card number. Once the customer's account has been verified, the lottery play can be entered. Later, after winning lottery entries are determined, the customers who placed these entries are automatically notified (presumably either according to telephone number or credit card number). A somewhat similar system is described in U.S. Pat. No. 5,083,272, "INTERACTIVE TELEPHONE LOTTERY SYSTEM WITH A VERIFICATION CODE", which additionally provides means for withdrawing payment for the lottery plays from a bank account by use of a Personal Identification Number ("PIN"), such as through an ATM network. Other similar telephone lottery systems are described in U.S. Pat. Nos. 4,969,183 and 4,996,705.

These systems all suffer the drawback that they require the telephone lottery system to be coupled to some type of payment network, i.e., telephone company billing system, credit card billing, or an ATM network, which increases their complexity and operating expenses. Furthermore, many banks are reluctant to allow the ATM networks to be directly coupled to gambling systems, and many states flatly prohibit lottery purchases to be made on credit, which would include both credit card purchases and telephone company billing.

SUMMARY OF THE INVENTION

The present invention provides an improved telephone lottery system in which the bettor pays for the lottery plays in advance, places lottery plays through a standard telephone, and retains a hard copy record of the play. The bettor purchases a lottery booklet with numbered playslips for recording plays. Thereafter, the bettor may call a telephone lottery computer having interactive voice response cababilities, to interface the player with the state lottery gaming computer for entering wagers. Through the telephone lottery computer, the player can place a lottery play at any time, after providing the playslip number and a validation code. Each numbered playslip provides a hard copy record for the bettor.

In a preferred embodiment, the booklets are printed with bar code and numeric identification plus individual ticket identification numbers and bar coding on each playslip. At purchase, the booklet is authorized for play through the telephone lottery computer, which provides a PIN for the booklet. To play, the bettor calls the telephone lottery computer and provides the booklet identification number and the PIN. The computer uses interactive voice capabilities to guide the player through play entry. For each lottery play, the bettor provides a playslip number. The selected lottery game play numbers/symbols are entered and verified by the player and may be recorded on the playslip. The telephone lottery computer returns a transaction number to be written on each ticket played to serve as a hard copy identification/verification of the transaction. Each ticket then serves as the claim-ticket/validation-document required to collect a prize. The bar coded ticket identification number may be scanned for automatic validation.

A further understanding of the nature and advantages of the invention may be realized by reference to the remaining portions of the specification and the drawings.

DETAILED DESCRIPTION OF PREFERRED EMBODIMENTS

Figure 1:
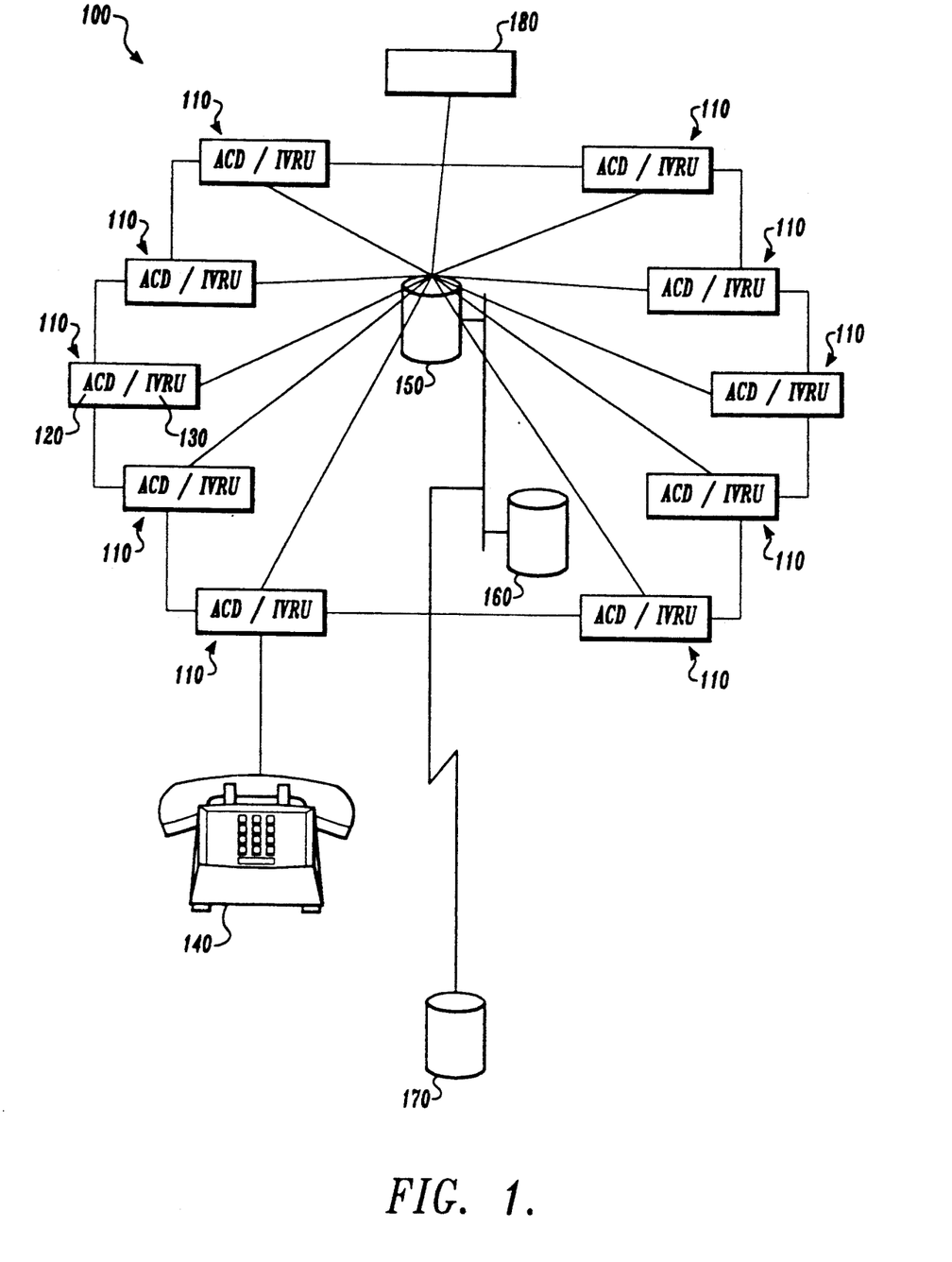
FIG. 1 illustrates a particular embodiment of a lottery telecommunications system according to the present invention.

A particular embodiment of a lottery telecommunications system according to the present invention is illustrated in FIG. 1. Lottery telecommunications system 100 includes a plurality of local response hosts 110. Local response hosts 110 are preferably demographically deployed with typically one for each telephone network Local Access and Transport Area ("LATA"), although centralized response hosts could be employed, even to the extent of having but a single response host for the whole system. Each local response host 110 in turn includes an Automatic Call Distributor ("ACD") 120, and an Interactive Voice Response Unit ("IVRU") 130. ACDs and IVRUs are well known, and will not be described here, although it is noted that the IVRUs may be responsive to both touch-tone signals and voice. The local response hosts 110 may receive calls from a plurality of telephones 140, and are also coupled to neighboring local response hosts and to a central telephone lottery play system computer 150. Central telephone lottery play system computer 150 is coupled both to a centralized state lottery computer 160 and to a backup/disaster-recovery host 170. Central telephone lottery play system computer 150 may also be coupled to dedicated retailer access devices 180, described later. ACD 120 of each local response host 110 will balance the call load to the associated IRVU 130, so that during peak loads additional calls will be routed to neighboring local response hosts. Additionally, if there are operational difficulties with central lottery play system computer 150, the local response host 110 will communicate with backup/disaster-recovery host 170.

Users of system 100 may thus use standard touch-tone or rotary dial telephones communicate with central telephone lottery play system computer 150 via the standard telephone networks. The various users contacting central telephone lottery play system computer 150 include both retailers authorizing a playbook for use or validating a ticket, and lottery players calling through an IVRU 130 to place a lottery play.

Figure 2A:
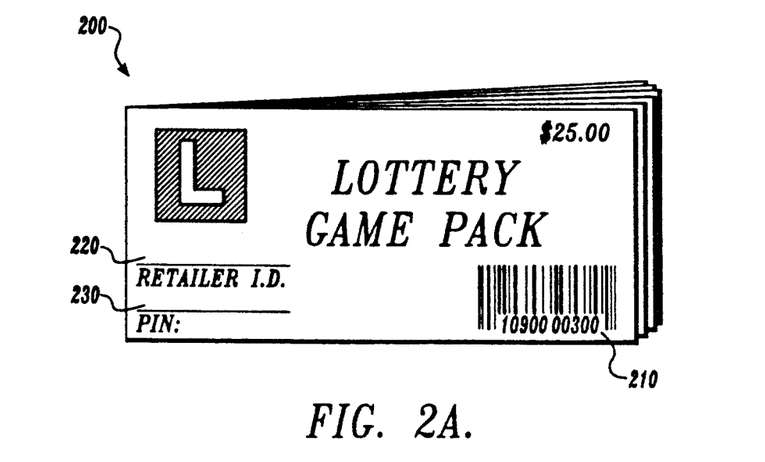
FIGS. 2A and 2B illustrate a lottery playslip booklet and an individual lottery playslip, respectively, according to a particular embodiment of the present invention.
Figure 2B:
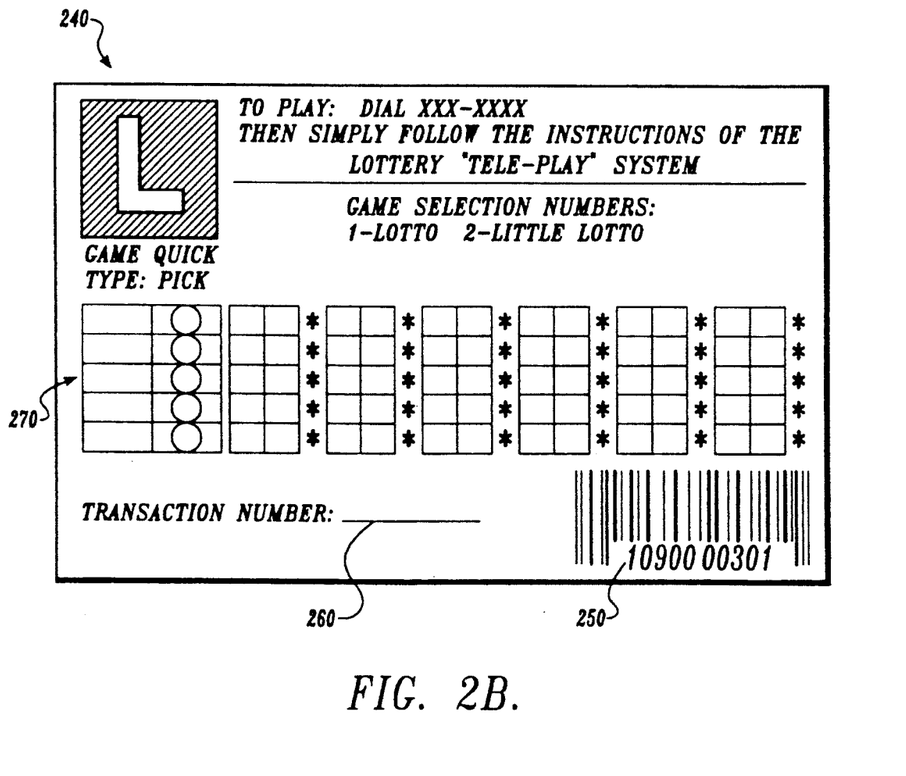

A lottery playslip booklet, or playbook, employed in a particular embodiment of the present invention is illustrated in FIG. 2A. Playbook 200 is identified by a unique serial number/bar code 210 printed on the front cover. Playbook 200 also has a retailer ID field 220 and a playbook PIN field 230. Printed on the inside cover of the playbook are instructions for telephone lottery play. Each playbook 200, such as illustrated in FIG. 2B, includes a number of individual playslips 240. A convenient number of playslips per playbook may be about from 10 to 25. Each playslip 240 is identified by a unique serial number/bar code 250 and has a field 260 for entering a verification transaction number. Also printed on playslip 240 are a number of fields 270 in which a lottery player may write down the type of game to be played and the chosen numbers/symbols or an indication of automatic random number selection. Fields 270 are ideally filled out prior to the player contacting the telephone lottery computer, to assist in error free entry of the lottery play, and also serve as a hard-copy record for the player. Lottery play entry fields for additional games may also be printed on the back of playslip 240. Alternatively, if cross marketing arrangements are made with restaurants, retail stores, etc., the back of playslip 240 may be printed with coupons.

Figure 3:
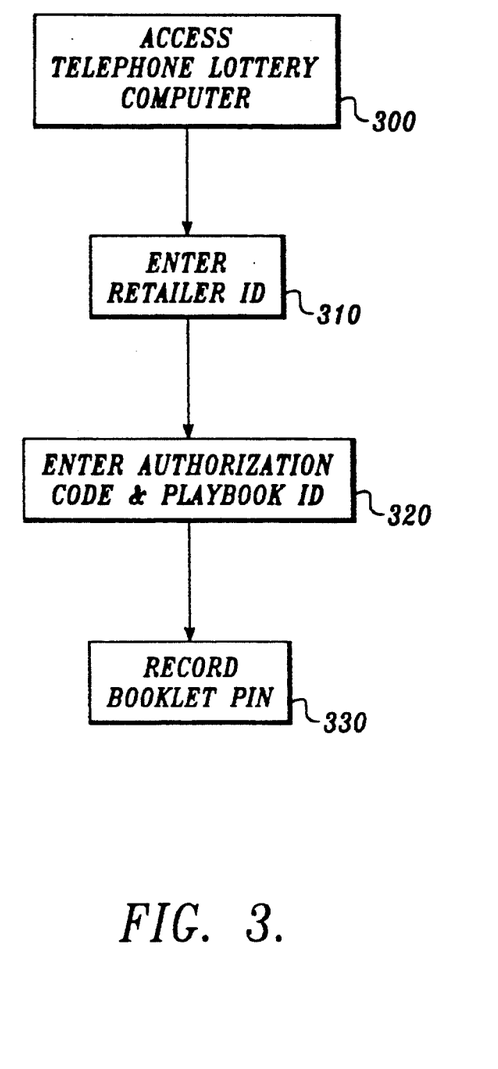
FIG. 3 is a flowchart illustrating the steps performed to authorize a playslip booklet for lottery play, according to a particular aspect of the present invention.

When a lottery player first purchases a playbook, the retailer performs the steps shown in FIG. 3 to authorize the playbook for use. At step 300 the retailer accesses the telephone lottery computer. A special purpose lottery device, such as device 180 of FIG. 1, accesses a special number provided for retailers via dial up communications or through a dedicated data line, so that the telephone lottery play system computer automatically handles their calls as playbook authorizations. Alternatively, the retailer might access a standard number and then enter a special code to enter the playbook authorization mode; this could be through a standard touch tone telephone or verbally by contacting a lottery telemarketing operator. Next, at step 310, the retailer enters their retailer ID number, or it is entered automatically by the lottery device. The retailer ID number operates as a security access code, and is also used for accounting purposes to track the number of playbooks authorized by a particular retailer, to debit their account for playbooks sold, and to credit the retailer for commissions.

After the retailer ID has been entered, the playbook serial number is entered at step 320. Step 320 may also include the entry of an additional authorization code by the retailer. In response to this the telephone lottery computer provides a booklet PIN of preferably 4 to 7 digits, which is imprinted or manually entered in the playbook as indicated at step 330. If employing a standard touch-tone telephone, the serial number may be entered by keying it in through the telephone keypad. To reduce data entry errors, the bar code may be scanned. If dedicated equipment 180 is used to access the telephone lottery computer, it may also include a port for receiving the playbook, scanning the bar code, and printing the PIN on the playbook. At this point the playbook is now "warm", or active in the telephone lottery play system, and may be used to enter lottery plays.

Figure 4:
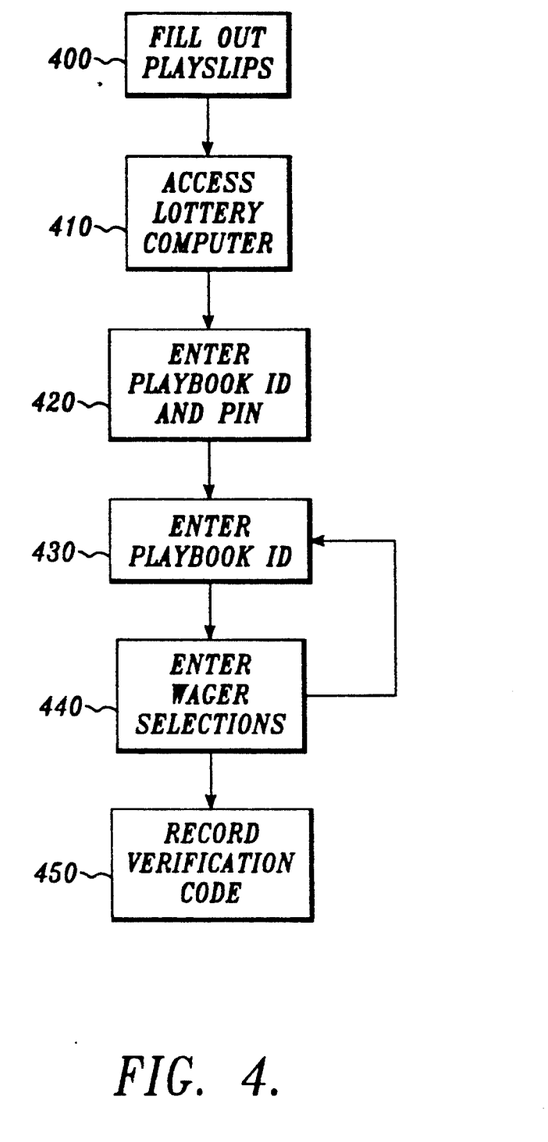
FIG. 4 is a flowchart illustrating the steps performed by a lottery player to enter a lottery play according to the present invention.

To enter lottery plays after purchasing a playbook, a player performs the steps illustrated in the flowchart of FIG. 4. At step 400 the player selects the desired number of playslips to be played, and the wager selections, such as the particular game to be played and numbers/symbols selected, for each playslip. This information is recorded on the playslip to provide a record of the wagers. Next, at step 410, the player accesses the telephone lottery play system IVRU computer. In the preferred embodiment, a toll free number is provided for this. After connecting to the telephone lottery play system IVRU computer, at step 420 the player enters the playbook ID and PIN. Once these are confirmed by the system, the player repeatedly performs steps 430 and 440 for each playslip to be wagered. The player enters the playslip ID at step 430, and then enters the wager selections for that playslip at step 440. The wager selections may include a random number selection, or manual selection of numbers/symbols. For manual selection of numbers/symbols, the numbers are repeated by the IVRU computer to the player and must be verified by the player. Once all data has been entered for the playslips to be played, the telephone lottery computer returns to the player a verification code to be written, at step 450, on each playslip wagered during that session.

The playslips then serve as a hardcopy record of the wager for the lottery player. To claim awards, the playslip is required and is treated as a standard lottery ticket, and should be capable of being bar-code scanned by standard machinery. Alternatively, the playslip serial number could be manually keyed into a lottery terminal.

Figure 5:
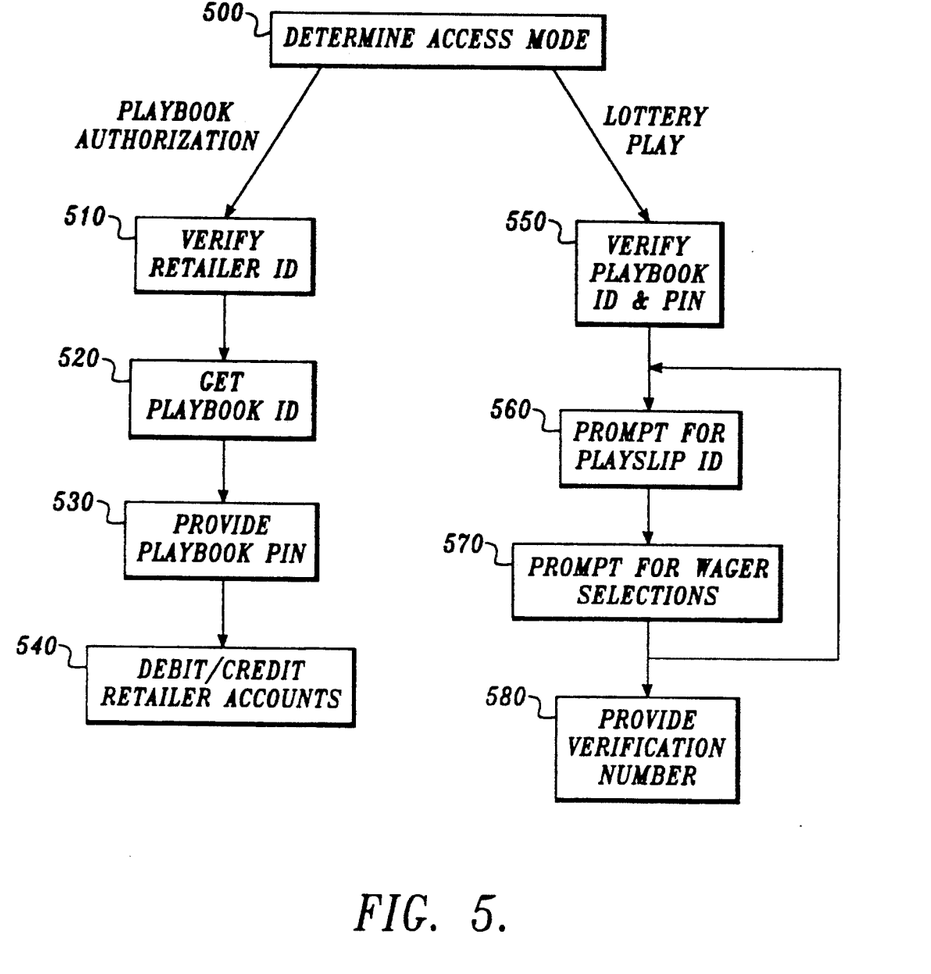
FIG. 5 is a flowchart illustrating the steps performed by the lottery telecommunications system of FIG. 1, in response to the various user calls placed to it.

FIG. 5 is a flowchart illustrating the steps performed by the lottery play telecommunications system of FIG. 1, in response to the various user calls placed to it. At step 500 it is determined whether the current call is for a retailer authorizing a playbook for use, or for a bettor entering a lottery play. In the preferred embodiment, this is simply determined by the local response unit according to the particular telephone number (or dedicated line) accessed, with different telephone numbers assigned to each mode. Lottery play entry transactions are handled primarily by the IVRU of the local response unit handling the call. The IVRU will exchange information periodically with the centralized telephone lottery play computer, but will not tie it up during lengthy user interaction. In the preferred embodiment, in which a dedicated device (utilizing a dedicated data link to the lottery play system computer) scans the playbook and can thus automatically provide the retailer ID and playbook ID, playbook authorization need not involve an IVRU. For retailers lacking the dedicated equipment, however, a voice interactive mode is provided.

In the playbook authorization mode, at step 510 the retailer ID is verified with telephone lottery play system computer 150 to be a valid retailer ID. If verified, then at step 520 the playbook ID number is input and verified to be for a previously unauthorized playbook. The playbook ID can also be checked against a list of playbooks assigned to the retailer specified by the retailer ID code. Next, at step 530 a playbook PIN is determined by the telephone lottery play computer (such as by random number generation), assigned to the uniquely identified playbook, and provided to the retailer. Finally, at step 540, the retailer's lottery accounts are debited for the playbook sold, and credited for the corresponding commission.

In the lottery play entry mode, at step 550 the local IVRU prompts the user for the playbook ID and PIN. These are then verified with the centralized telephone lottery computer. Once verified, the lottery wagers for each playslip are entered. At step 560 the IVRU prompts the user for a playslip ID, which is then verified with the telephone lottery computer as being an as-yet-unplayed playslip from the authorized playbook. If the playslip ID is not for an as-yet-unplayed playslip, i.e., wager selection information has previously been provided for the playslip, then the playslip is invalid for further play, and the user will not be allowed to enter new wager selection information for the playslip. At this step, and at other user data entry steps, if the user repeatedly enters data that is rejected as invalid by the system, the user may be automatically forwarded to an operator for assistance, or provided a toll free number to call for assistance.

Next, at step 570 the user is guided through the wager selection process, which includes selecting the type of lottery game and chosen numbers/symbols, etc. Unless random number selection is requested by the user, the selected numbers are repeated by the IVRU for verification by the user. Steps 560 and 570 are repeated for each playslip the user desires to play. Once all wager selections for all the playslips have been provided to the IVRU, at step 580 the wager information is registered with the central state lottery computer, and a verification code is returned. The local IVRU provides the information to the centralized telephone lottery computer, which in turn contacts the central state lottery computer.

All of the user interaction is thus controlled by the local IVRU. The telephone lottery computer, in turn, manages all of the playbook and playslip information so that telephone lottery plays can be presented to the central state lottery computer in the same manner as lottery plays from standard equipment, so that no changes are necessary to the existing lottery equipment.

It is to be understood that the above description is intended to be illustrative and not restrictive. Many variations and equivalents will be apparent to those of skill in the art upon reviewing the above description. For example, as an alternative to the backup/disaster-recovery host, all of the telephone lottery transactions may be recorded in DTMF tones on an optical disk. Furthermore, alternative methods of verifying playbook and playslip identification and validity could be employed. The described system could also be augmented to provide for "second-chance" lottery entries, as well as integrate with cable or standard broadcast television lottery shows to provide an interactive wagering capability. Additionally, the equipment for validating winning playslips could also be used for validation of winning "scratcher" or other instant win type lottery tickets. The scope of the invention should, therefore, be determined with reference to the appended claims, along with the full scope of equivalents to which such claims are entitled.

What is claimed is:

1. An interactive telephone lottery system for operating in conjunction with a state lottery computer so as to allow the lottery wagers to be placed through a telephone, said interactive telephone lottery system comprising:
    a) means for authorizing telephone lottery playbooks for use, each said telephone lottery playbook having an associated playbook identification number and at least one playslip, each said playslip having an associated playslip identification number, said authorizing means also for providing a Personal Identification Number ("PIN") for use with an authorized telephone lottery playbook;
    b) means, coupled to said telephone, for placing lottery wagers, comprising
        i) means for prompting a user for said playbook identification number and said playbook PIN,
        ii) means for verifying validity of said playbook identification number and said playbook PIN,
        iii) means for prompting said user for an identification number for a playslip from said playbook,
        iv) means for prompting said user for a wager selection for said playslip, and
        v) means for communicating said wager selection to said state lottery computer.

2. The interactive telephone lottery system of claim 1, wherein said lottery wager placing means further comprises means for communicating to said user a verification number of said wager selection.

3. The interactive telephone lottery system of claim 2, wherein said playbook identification number is bar-coded on said playbook, wherein said playbook authorizing means is coupled to said telephone lottery computer and comprises a retail location playbook scanner for scanning said bar-coded playbook identification number and for communicating a retailer identification number and said playbook identification number to said telephone lottery computer.

4. The interactive telephone lottery system of claim 3, wherein said playslip identification numbers are bar-coded on said playslips, said interactive telephone lottery system further comprising means, coupled to said central state lottery computer, for scanning said bar-coded playslip identification number and for identifying winning playslips.

5. The interactive telephone lottery system of claim 4, wherein said lottery wager placing means further comprises means for communicating to said user a verification number for said lottery wager selection information.

6. The interactive telephone lottery system of claim 3, wherein said lottery wager placing means further comprises means for communicating to said user a verification number for said wager selection.

7. The interactive telephone lottery system of claim 1, wherein said lottery wager placing means comprises a telephone lottery computer and an interactive voice response unit coupled between said telephone and said telephone lottery computer, wherein said telephone lottery computer is additionally coupled to said central state lottery computer.

8. The interactive telephone lottery system of claim 7, wherein said lottery wager placing means further comprises means for communicating to said user a verification number for said wager selection.

9. An interactive telephone lottery system for operating in conjunction with a central state lottery computer so as to allow lottery wagers to be placed through a telephone, said interactive telephone lottery system comprising:
 a) a telephone lottery computer coupled to said central state lottery computer;
 b) a retail location playbook scanner for scanning a telephone lottery playbook, said telephone lottery playbook having an associated playbook identification number and at least one playslip, each said playslip having an associated playslip identification number, wherein said playbook scanner also communicates said playbook identification number to said telephone lottery computer and displays an authorization number provided by said telephone lottery;
 c) a local response unit, including an automatic call distributor and an interactive voice response unit, coupled between said telephone and said telephone lottery system, said interactive voice response unit including means for prompting a user for said playbook identification number and said authorization number, said playslip identification number, and lottery wager selection information, wherein said interactive voice response unit is further for communicating said playbook identification number, said authorization number, said playslip identification number, and said lottery wager selection information to said telephone lottery computer.

10. A method of operating a lottery, comprising the steps of:
 (a) providing a telephone lottery playbook, each playbook having an associated playbook number and at least one playslip, each playslip having a playslip identification number;
 b) thereafter coupling a telephone to a telephone lottery computer;
 c) thereafter prompting a user for said playslip identification number;
 d) thereafter determining whether wager selection information has previously been provided for said playslip;
 e) thereafter, if wager selection information has not previously been provided for said playslip, prompting said suer for wager selection information for said wager selection information and information identifying said playslip to a state lottery computer.

11. An interactive telephone lottery system for operating in conjunction with a central lottery computer so as to allow lottery wagers to be placed through a telephone, said interactive telephone lottery system comprising:
 a) a telephone lottery computer coupled to said central lottery computer;
 b) a retail location playbook scanner for scanning a telephone lottery playbook, said telephone lottery playbook having an associated playbook identification number and at least one playslip, each said playslip having an associated playslip identification number, wherein said playbook scanner also communicates said playbook identification number to said telephone lottery computer and displays an authorization number provided by said telephone lottery;
 c) a local response unit, including an automatic call distributor and an interactive voice response unit, coupled between said telephone and said telephone lottery system, said interactive voice response unit including means for prompting a user for said playbook identification number and said authorization number, said playslip identification number, and lottery wager selection information, wherein said interactive voice response unit is further for communicating said playbook identification number, said authorization number, said playslip identification number, and said lottery wager selection information to said telephone lottery computer.

12. An interactive telephone lottery system for operating in conjunction with a central lottery computer so as to allow lottery wagers to be placed through a telephone, said interactive telephone lottery system comprising:
 a) means for authorizing telephone lottery playbooks for use, each said telephone lottery playbook having an associated playbook identification number and at least one playslip, each said playslip having an associated playslip identification number, said authorizing means also for providing a Personal Identification Number ("PIN") for use with an authorized telephone lottery playbook;
 b) means, coupled to said telephone, for placing lottery wagers, including
  i) means for prompting a user for said playbook identification number and said playbook PIN,
  ii) means for verifying validity of said playbook identification number and said playbook PIN,
  iii) means for prompting said user for an identification number for a playslip from said playbook,
  iv) means for prompting said user for a wager selection for said playslip, and
  v) means for communicating said wager selection to said state lottery computer.

13. The interactive telephone lottery system of claim 12, wherein said lottery wager placing means comprises a telephone lottery computer and an interactive voice response unit coupled between said telephone and said telephone lottery computer, wherein said telephone lottery computer is additionally coupled to said central state lottery computer.

14. The interactive telephone lottery system of claim 13, wherein said playbook identification number is bar-coded on said playbook, wherein said playbook authorizing means is coupled to said telephone lottery computer and comprises a retail location playbook scanner for scanning said bar-coded playbook identification number and for communicating a retailer identification number and said playbook identification number to said telephone lottery computer.

15. The interactive telephone lottery system of claim 14, wherein said playslip identification numbers are bar-coded on said playslips, said interactive telephone lottery system further comprising means, coupled to said central state lottery computer, for scanning said bar-coded playslip identification number and for identifying winning playslips.

16. The interactive telephone lottery system of claim 15, wherein said lottery wager placing means further comprises means for communicating to said user a verification number for said lottery wager selection information.

17. The interactive telephone lottery system of claim 12, wherein said lottery wager placing means further comprises means for communicating to said user a verification number for said wager selection.

18. The interactive telephone lottery system of claim 13, wherein said lottery wager placing means further comprises means for communicating to said user a verification number for said wager selection.

19. The interactive telephone lottery system of claim 14, wherein said lottery wager placing means further comprises means for communicating to said user a verification number for said wager selection.

* * * * *

UNITED STATES PATENT AND TRADEMARK OFFICE
CERTIFICATE OF CORRECTION

PATENT NO. : 5,327,485
DATED : July 5, 1994
INVENTOR(S) : Leaden, ET AL

It is certified that error appears in the above-indentified patent and that said Letters Patent is hereby corrected as shown below:

In column 7, line 64, please delete "suer", and please insert --user --.

Signed and Sealed this

Fourth Day of April, 1995

*Attest:*

BRUCE LEHMAN

*Attesting Officer*  Commissioner of Patents and Trademarks